United States Patent
Mazur et al.

[11] Patent Number: 5,504,379
[45] Date of Patent: Apr. 2, 1996

[54] METHOD AND APPARATUS FOR SENSING A VEHICLE CRASH USING A VELOCITY DISPLACEMENT METRIC

[75] Inventors: Joseph F. Mazur, Washington; Scott B. Gentry, Romeo; Brian K. Blackburn, Rochester, all of Mich.

[73] Assignee: TRW Vehicle Safety Systems Inc., Lyndhurst, Ohio

[21] Appl. No.: 311,571

[22] Filed: Sep. 23, 1994

[51] Int. Cl.⁶ .................................................. B60R 21/32
[52] U.S. Cl. .......................... 307/10.1; 180/282; 280/735; 340/436
[58] Field of Search ...................... 307/10.1; 364/424.05; 180/282; 280/735, 734; 340/436, 669, 438; 73/488, 510, 511; 324/162

[56] References Cited

U.S. PATENT DOCUMENTS

| | | | |
|---|---|---|---|
| 4,410,875 | 10/1983 | Spies et al. | 280/735 |
| 4,638,179 | 1/1987 | Mattes et al. | 280/735 |
| 4,984,464 | 1/1991 | Thomas et al. | 280/735 |
| 4,985,835 | 1/1991 | Sterler et al. | 364/424.05 |
| 4,994,972 | 2/1991 | Diller | 364/424.05 |
| 5,014,810 | 5/1991 | Mattes et al. | 180/268 |
| 5,157,268 | 10/1992 | Spies et al. | 307/10.1 |
| 5,189,311 | 2/1993 | Moriyama et al. | 307/10.1 |
| 5,229,943 | 7/1993 | Eigler et al. | 307/10.1 |
| 5,365,114 | 11/1994 | Tsurushima et al. | 307/10.1 |
| 5,407,228 | 4/1995 | Shibata et al. | 280/735 |
| 5,445,413 | 8/1995 | Rudolf et al. | 280/735 |

Primary Examiner—William M. Shoop, Jr.
Assistant Examiner—Richard T. Elms
Attorney, Agent, or Firm—Tarolli, Sundheim & Covell

[57] ABSTRACT

A vehicle crash sensing arrangement includes an accelerometer (28) and an integrator (36) for determining crash velocity in response to sensed crash acceleration. A second integrator (40) determines a crash displacement value from the crash velocity value. A variable velocity threshold value is determined (44) in response to the determined crash displacement value. The crash velocity value is compared (48) against the variable threshold value. The comparator (48) provides a signal indicative of a vehicle crash condition when the crash velocity value is greater than the velocity threshold value.

10 Claims, 3 Drawing Sheets

METHOD AND APPARATUS FOR SENSING A VEHICLE CRASH USING A VELOCITY DISPLACEMENT METRIC

TECHNICAL FIELD

The present invention is directed to an occupant restraint system and is particularly directed to a method and apparatus for sensing a vehicle crash using a velocity displacement metric.

BACKGROUND

Vehicle safety restraint systems for detecting the occurrence of a vehicle crash and actuating a safety restraint in response to such a detected crash are known in the art. Such systems often include an accelerometer mounted to the vehicle. A controller, such as a microcomputer, monitors the accelerometer output. The controller includes an algorithm that is used to discriminate, based on accelerometer output, between a deployment crash event for which the safety restraint is to be actuated and a non-deployment crash event for which the safety restraint is not to be actuated. These algorithms are known as "crash metrics". Certain known crash metrics monitor crash velocity as a function of time or crash displacement as a function of time based on the acceleration. If crash velocity or crash displacement exceed associated threshold values, the restraint is actuated. It is known to have fixed thresholds or thresholds that vary as a function of time.

SUMMARY OF THE INVENTION

In accordance with the present invention, a method and apparatus are provided for sensing a vehicle crash using a crash velocity metric. The crash velocity is compared against a variable velocity threshold value that is varied as a function of crash displacement.

An apparatus in accordance with the present invention comprises means for determining a crash velocity value and means for determining a crash displacement value. Threshold determining means determines a velocity threshold value functionally related to the crash displacement value. The apparatus further includes control means operatively connected to the velocity determining means and the threshold determining means for providing a signal indicative of a vehicle crash condition when the crash velocity value is greater than the velocity threshold value.

In accordance with a preferred embodiment of the present invention, the crash velocity value is determined in response to a crash acceleration signal provided by an accelerometer mounted to the vehicle. To sense side impacts, the accelerometer is mounted to the vehicle with an axis of sensitivity oriented so as to sense sideways acceleration of the vehicle. In such an arrangement, an air bag is mounted in the vehicle to restrain sideways movement of the occupant.

The variable threshold value is determined, in accordance with one embodiment of the invention, as a parabolic function of crash displacement. The variable threshold value may, in accordance with another embodiment, be determined in accordance with a function that (i) increases linearly between a first displacement value and a second displacement value, (ii) is a constant value between the second displacement value and a third displacement value, (iii) decreases linearly between the third displacement value and a fourth displacement value, and (iv) is a constant for displacement values greater than the fourth displacement value.

A method for sensing a vehicle crash condition in accordance with the present invention includes the steps of sensing vehicle acceleration, determining a crash velocity value from the sensed acceleration, and determining a crash displacement value from the determined crash velocity value. A velocity threshold value is determined in response to the determined displacement value. The method further includes the steps of comparing the determined velocity value against the determined velocity threshold value, and providing an actuation signal when the comparing step indicates the determined velocity value is greater than the determined velocity threshold value.

BRIEF DESCRIPTION OF THE DRAWINGS

Other features and advantages of the present invention will become apparent to those skilled in the art to which the present invention relates from a reading of the following detailed description with reference to the accompanying drawings, in which.

DESCRIPTION OF PREFERRED EMBODIMENT

Figure 1:
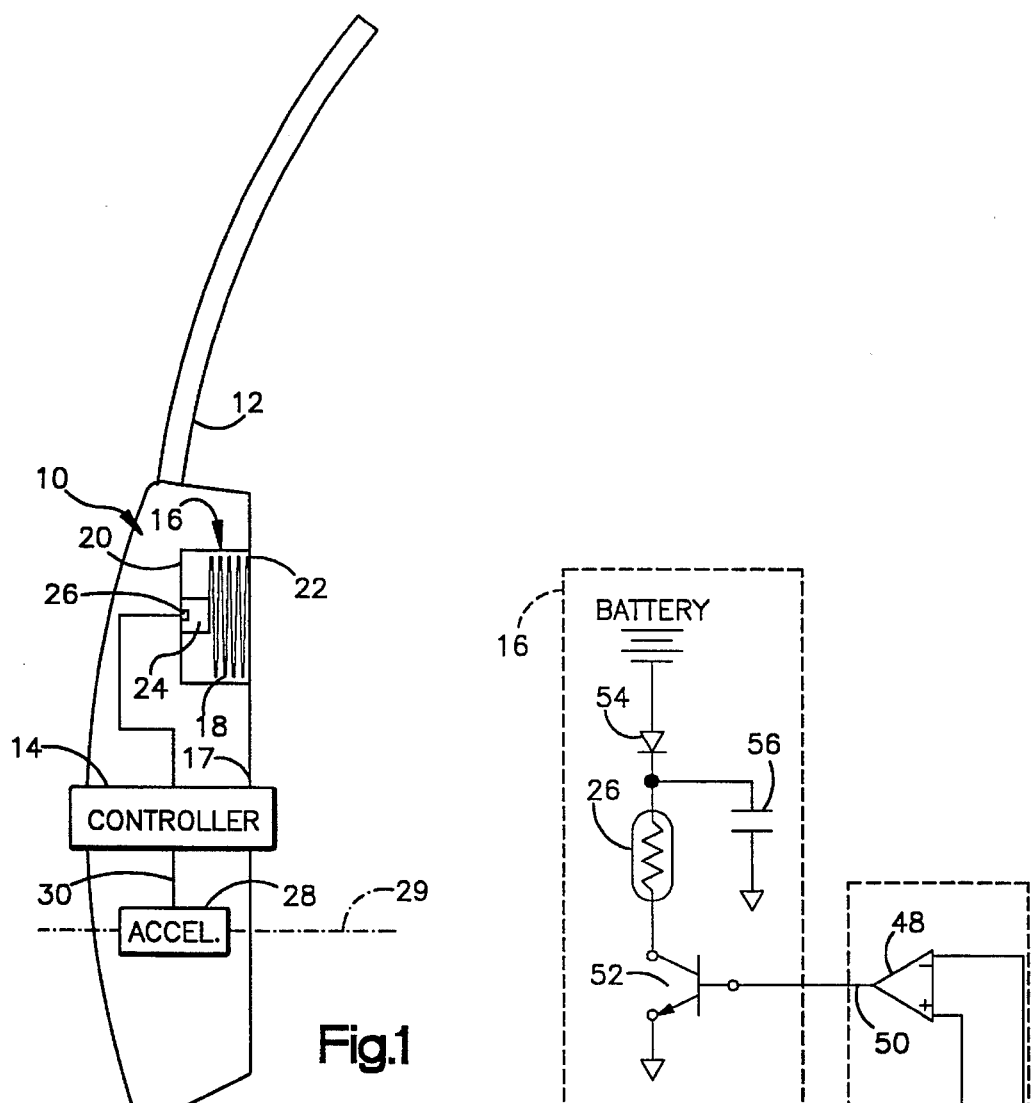
FIG. 1 is a schematic diagram illustrating an embodiment of the present invention.

Referring to FIG. 1, a side restraint system 10, in accordance with the present invention, is mounted in a vehicle door 12. The side restraint system 10 includes a controller 14, preferably a microcomputer, operatively connected to an air bag assembly 16. The air bag assembly 16 is mounted against the interior trim panel 17 of the vehicle door 12. Those skilled in the art will appreciate that the air bag assembly 16 may be mounted in other locations such as the door arm rest (not shown) or the side of the occupant's seat (not shown).

The air bag assembly 16 includes an air bag 18 that is stored within an air bag housing 20. A cover 22 forms one side of the air bag housing 20 and covers the stored air bag 18. The cover 22 is designed to open easily upon inflation of the air bag 18.

A source of inflation fluid 24 is operatively connected to the air bag 18. The source of inflation fluid 24 can be an ignitable, gas producing material and/or a container in which pressurized fluid is stored. An igniter or squib 26 is operatively connected to the source of inflation fluid 24 to effect inflation of the air bag 18 when energized. Igniter 26 is operatively controlled by the controller 14.

The controller 14 is operatively connected to an accelerometer 28. The accelerometer 28 provides a signal 30 indicative of sideways acceleration of the vehicle as would occur during a sideways crash event or side impact. Any of the various types of known acceleration sensors may be used. The accelerometer is oriented such that its associated axis of sensitivity 29 is perpendicular to the vehicle's longitudinal axis. This orientation results in the accelerometer having a sensitivity to crashes having a component perpendicular to the vehicle's longitudinal axis. In an alternative embodiment, the accelerometer 28 is mounted, not in a vehicle door, but at a different location in the vehicle with its axis of sensitivity oriented perpendicular to the vehicle longitudinal axis.

Figure 2:
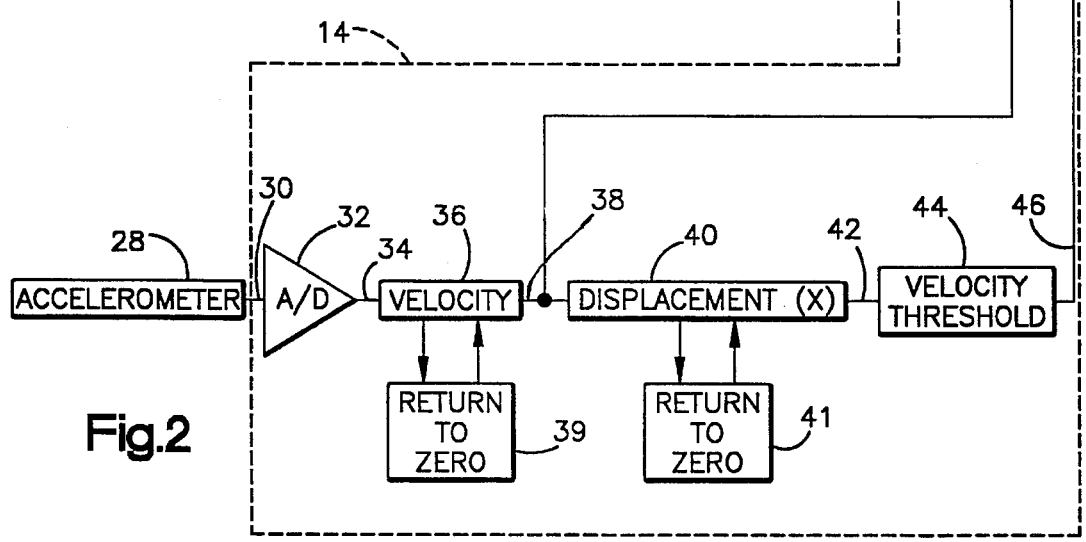
FIG. 2 is a schematic block diagram illustrating portions shown in FIG. 1 in further detail.

Referring to FIG. 2, the controller 14 monitors the signal 30 provided by the accelerometer 28. An analog-to-digital ("A/D") converter 32 internal to controller 14 converts the analog signal 30 to a digital signal. The rate of the conversions is selected in accordance with known sampling criteria to assure that a reliable representation of the analog acceleration signal 30 is obtained. After each analog-to-digital conversion, the analog-to-digital converter 32 provides a digital acceleration signal 34 to a velocity determining function or velocity metric 36. The signal 34 has a digital value corresponding to the analog value of the acceleration signal 30 at that instant in time.

The velocity metric 36 of controller 14 determines a crash velocity value and outputs a crash velocity signal 38 in response to the acceleration signal. The value of the crash velocity signal 38 is determined by integrating the acceleration signal. In a microcomputer, this integration is accomplished by summing consecutive values of the digitally converted signal 34. Each time the converter 32 performs an analog-to-digital conversion, the newly converted value is provided to the velocity metric 36. The velocity metric 36 sums the newly converted value with its previously summed value. The resultant summation is a signal 38 having a value indicative of the crash velocity value.

For example, if the vehicle is traveling down a road at a fixed speed, i.e., no acceleration or deceleration is occurring, the values of the converted signal 34 and the crash velocity signal 38 are both zero. If the vehicle is then struck on its side by another vehicle, it experiences a sudden acceleration which causes the signal 30 to be non-zero. After the first conversion by the analog-to-digital converter 32 of this non-zero signal 30, the converted signal 34 has a value of $a_1$. The velocity function 36 sums $a_1$ with its previous value which, in this case, is zero, to provide a crash velocity 38 having a value $a_1$. After the second conversion by the analog-to-digital converter 32, the conversion signal 34 has a value of $a_2$. The velocity function 36 sums $a_2$ with its previous value $a_1$ and provides a crash velocity signal 38 having a value of $(a_1+a_2)$. After the third conversion by the analog-to-digital converter 32, the conversion signal 34 has a value of $a_3$. The velocity determining function 36 sums $a_3$ with its previous value of $(a_1+a_2)$ and provides a crash velocity signal 38 having a value of $(a_1+a_2+a_3)$.

The controller 14 includes a return-to-zero function 39. The return-to-zero function 39 operates to reset the value of the crash velocity signal 38 to zero when the acceleration signal goes to zero without the use of a timer. In accordance with one embodiment of the present invention, the return-to-zero function 39 subtracts a small constant from the velocity signal to reduce the value of the crash velocity signal 38 gradually to zero. When the crash velocity signal 38 reaches zero, the return-to-zero function stops the subtraction.

In an alternative embodiment, the return-to-zero function 39 initially subtracts a small percentage of the value of the determined velocity signal from the velocity signal. After the value of the velocity signal is reduced to a predetermined value, a constant is subtracted until the velocity signal reaches zero. This embodiment functions in much the same way as the previous embodiment, except that the updated value of the crash velocity signal 38 will approach zero exponentially until the predetermined value is reached and, thereafter, linearly until the value reaches zero. Other return-to-zero arrangements may also be used.

The purpose of the return-to-zero function is to assure that accelerations do not accumulate, resulting in an undesired deployment of the air bag. The return-to-zero function 39 removes the effect of "old" acceleration values not indicative of or the result of a true vehicle crash condition.

The crash velocity signal 38 is provided to a displacement determining function or displacement metric 40. The displacement metric 40 determines a value of crash displacement by integrating the crash velocity signal 38 and outputs a crash displacement signal 42. In a microcomputer, the integration is accomplished by summing the crash velocity signal 38 over time. The crash displacement metric 40 has an associated return-to-zero function 41 that gradually returns the value of the crash displacement signal back to zero when the determined crash velocity signal 38 goes to zero.

Initially, when the vehicle is traveling down the road, the crash velocity signal 38 and the crash displacement signal 42 have values of zero. When an acceleration signal is output from the accelerometer 28, the velocity determining function 40 determines a velocity value of $V_1$. At this time, the displacement determining function 40 sums $V_1$ with the previous value (i.e., zero) and provides an updated crash displacement signal 42 having a value of $V_1$. If the crash velocity signal 38 has a value of $V_2$ after its next update by the velocity metric 36, the displacement metric 40 will sum $V_2$ with the previous value of the crash displacement signal 42 ($V_1$) and provide an updated crash displacement signal 42 having a value of $(V_1+V_2)$. Likewise, if the value of the crash velocity signal 38 after its next update is equal to $V_3$, the displacement determining function 40 will sum $V_3$ with the previous value of the crash displacement signal 42 and provide an updated crash displacement signal 42 having a value of $(V_1+V_2+V_3)$. If the velocity signal 38 goes to zero, the return-to-zero function 41 will gradually return the determined crash displacement signal 42 back to zero as described above with regard to the return-to-zero function 39. This removes the effect of displacement accumulations.

The crash displacement signal 42 is provided to a velocity threshold determining function 44. The velocity threshold determining function 44 provides a velocity threshold signal 46 that is functionally related to the value of the crash displacement signal 42. Various functional relationships between the value of the crash displacement signal 42 and the value of the velocity threshold signal 46 are contemplated by the present invention. The functional relationship would preferably be empirically determined for each vehicle platform.

The velocity threshold signal 46 is provided as one input to a comparator 48. The other input of the comparator 48 is connected to the crash velocity signal 38. The comparator 48 compares the value of the crash velocity signal 38 against the value of the velocity threshold signal 46. When the value of the crash velocity signal 38 is less than the value of the velocity threshold signal 46, the output 50 of comparator 48 is a digital LOW. Such an occurrence is indicative of a non-deployment crash condition or no crash event. When the value of the crash velocity signal 38 is greater than the value of the velocity threshold signal 46, the output signal 50 of comparator 48 is a digital HIGH. A digital HIGH is indicative of a deployment crash condition.

The controller 14 provides the actuation signal 50 to the air bag assembly 16 to control deployment of the bag. Specifically, the output 50 of comparator 48 is connected to the base of a transistor 52. The emitter of the transistor 52 is connected to ground, and the collector connected to one end of the squib 26. The other end of the squib 26 is connected to the battery through a diode 54. When a crash condition requires deployment of the air bag 16, the deployment signal 50 is a digital HIGH. This digital HIGH turns ON the transistor 52 which causes sufficient current to flow through the squib 26 so as to ignite the squib. A capacitor 56 is connected between ground and the cathode of the diode 54. The capacitor 56 functions to assure that sufficient current is available for the squib 26 should the vehicle battery be disconnected during a vehicle collision as is well known in the art.

Figure 3:
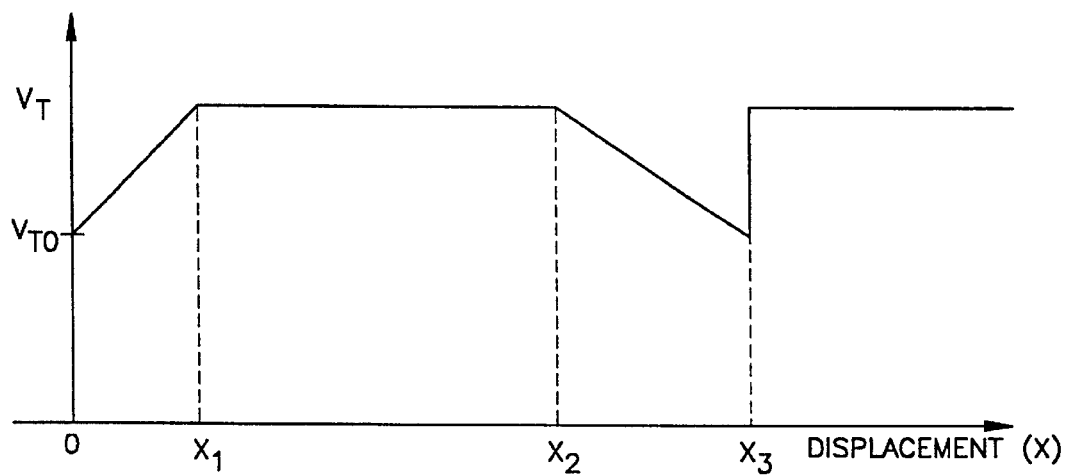
FIG. 3 is a graphical representation of a crash velocity threshold value as a function of crash displacement in accordance with one embodiment of the present invention.

Referring to FIG. 3, one contemplated functional relationship between the velocity threshold signal 46 and the crash displacement signal 42 is shown. The value of the threshold signal 46 (designated $V_T$) is shown on the ordinate and the value of the crash displacement signal 42 (designated X) is on the abscissa. At zero displacement, the velocity threshold signal 46 has an initial value of $V_{TO}$ which is empirically determined for a particular vehicle. For displacement values from zero to $X_1$, the velocity threshold value $V_T$ increases linearly with the displacement value X. This allows the system to detect fast developing crash conditions which require fast deployment of the vehicle air bag 16. A constant velocity threshold $V_T$ is provided for displacement values between $X_1$ and $X_2$ to allow for detection of conventional vehicle crash conditions. For displacement values between $X_2$ and $X_3$, the velocity threshold $V_T$ is decreased linearly as a function of the displacement. This allows the system to detect a slow developing deployment crash condition. The velocity threshold $V_T$ is set to a constant value at a displacement equal to or greater than $X_3$.

Figure 4:
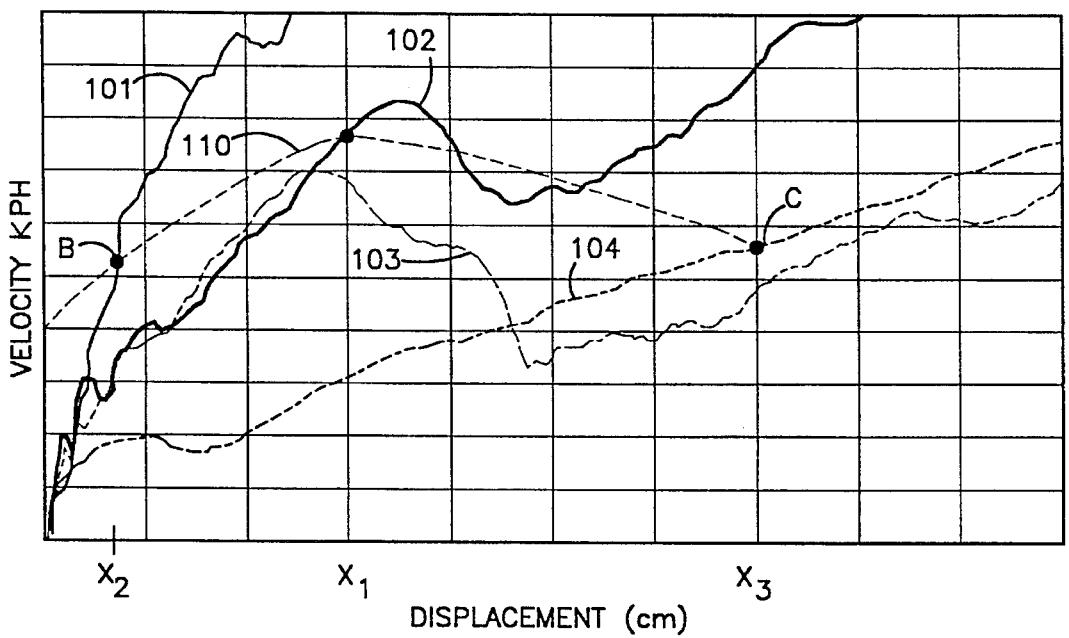
FIG. 4 is a graphical representation of a crash velocity threshold value as a function of crash displacement in accordance with another embodiment of the present invention.

Referring to FIG. 4, an alternative embodiment of the functional relationship between the velocity threshold and displacement is illustrated. Also illustrated are the velocity values for four different crash events as a function of displacement. The ordinate is the crash velocity and the abscissa the crash displacement X. Lines 101 through 104 represent, respectively: 1) a 50 KPH crash into door 12; 2) a 26 KPH crash into door 12; 3) a 17 KPH crash into door; and 4) a 50 KPH off-door crash, i.e., into the side of the vehicle but not directly into door 12. Each line shows how crash velocity and crash displacement are related for an associated crash condition. Line 110 represents the value of the velocity threshold signal 46 as a function of the value of the crash displacement signal 42. For crash displacement values less than or equal to $X_1$, the velocity threshold signal 46 has a first inverted parabolic relationship. For crash displacement values greater than $X_1$, the velocity threshold signal 46 has a second inverted parabolic relationship. The shape of the first inverted parabolic relationship of the velocity threshold signal 46 for X from 0 to $X_1$ allows the system to detect a crash before much displacement occurs, as is needed in a fast developing crash. A 50 KPH crash, for example, would cause the system to activate the vehicle air bag 16 at a displacement of $X_2$. The second inverted parabolic relationship of the velocity threshold signal 46 for displacements greater than $X_1$ allows the system to detect crash conditions having larger displacements, as would occur during a slow developing crash. For example, a 50 KPH off-door crash condition would cause the system to activate the vehicle air bag 16 at point $X_3$. Without the variation in the velocity threshold signal 46 provided by the second inverted parabolic relationship (e.g., a constant velocity threshold), such an off-door crash condition may not have been detected until a larger displacement occurred. One skilled in the art will understand that the functional relationships between the velocity threshold signal 46 and the crash displacement signal 42 described with respect to FIGS. 3 and 4 are by no means the only functional relationships possible. The description of these particular functional relationships is intended in no way to limit the present invention to such functional relationships. By empirically testing a vehicle platform of interest and predetermining the desired deployment conditions, the threshold function can then be determined. The threshold value can either be determined by equation as a function of displacement or by use of a look-up table having prestored values of thresholds versus displacement.

Figure 5:
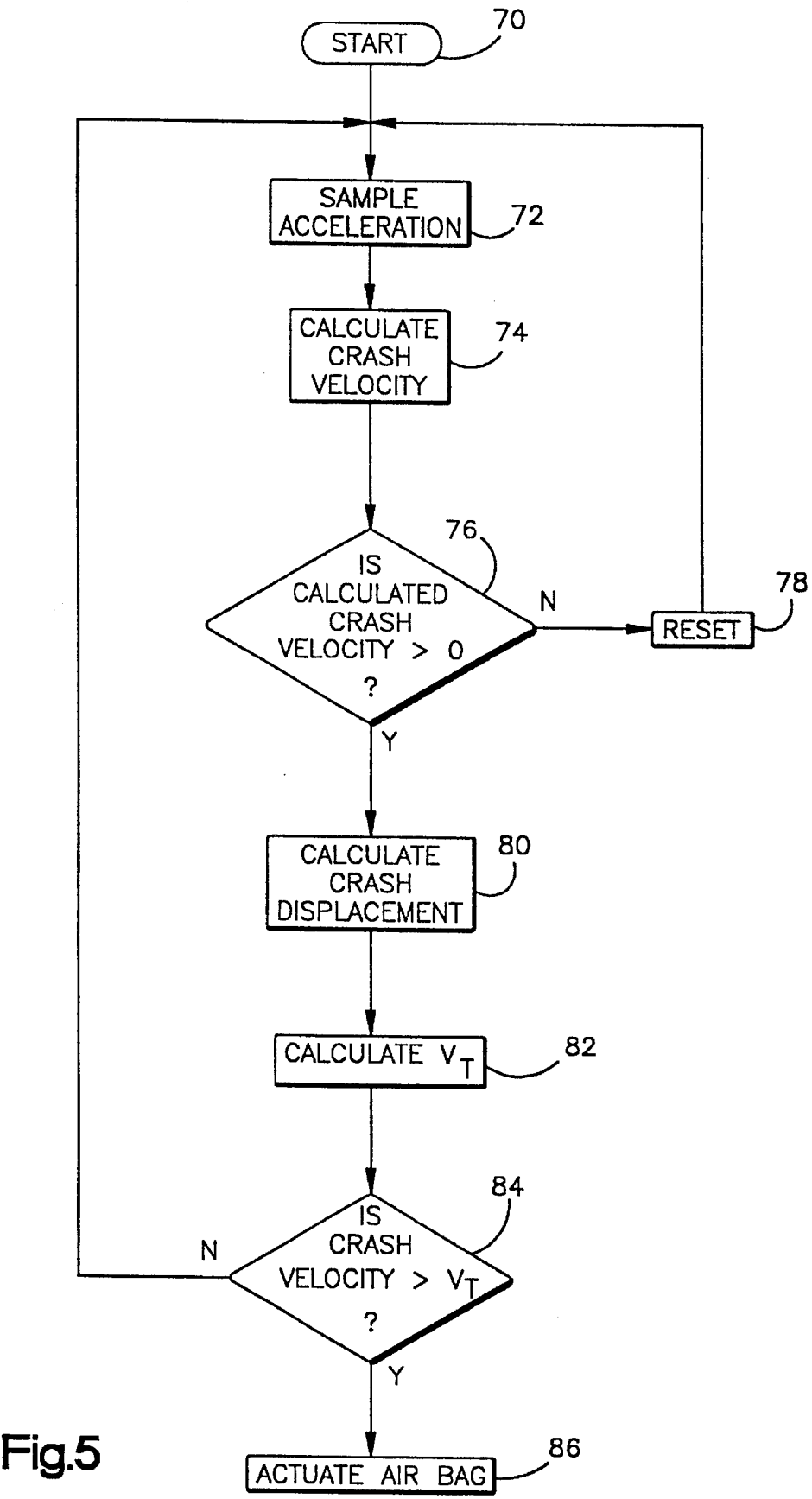
FIG. 5 is a flow chart showing a control process in accordance with the present invention.

Referring to FIG. 5, a control process followed by the controller 14 is illustrated. In accordance with a preferred embodiment of the present invention, the controller 14 is a microcomputer programmed to execute the control process illustrated in FIG. 5. The control process starts in step 70 where the controller 14 sets internal registers, memory locations, and flags to initial values. In step 72, the controller 14 samples the analog acceleration signal 30 provided by the sensor 28. A sampling time for step 72 corresponds to the time of an analog-to-digital conversion of the acceleration signal 30. The process then proceeds to step 74 where the controller 14 determines a crash velocity by integrating the acceleration signal, i.e., summing the sampled acceleration values with the previously determined acceleration value. For example, if the previously determined crash velocity is $V_{old}$ and the current sampled acceleration value equals $a_1$, step 74 will add $V_{old}$ and $a_1$. Step 74 also subtracts a small reset constant C from the velocity value. Constant C serves to return the crash velocity value to zero. This is the return-to-zero function described above. When the acceleration value goes to zero, the crash velocity value is reduced by C each cycle until it eventually becomes zero. The velocity value is not permitted to be less than zero.

The process proceeds to step 76 where a determination is made as to whether the crash velocity value is greater than zero. If the determination is negative, the process goes to step 78. Step 78 resets the control process by resetting all variables to their initial values. From step 78, the process loops back to step 72.

If the determination in step 76 is affirmative, the process proceeds to step 80. Step 80 determines a crash displacement value by integrating the crash velocity value. As mentioned above, this integration is done by summing.

After determining the crash displacement value in step 80, the control process goes to step 82 where a velocity threshold $V_T$ is determined. A functional relationship between crash displacement and velocity threshold $V_T$ is predetermined. FIGS. 3 and 4 illustrate possible relationships between the crash displacement and the velocity threshold for two embodiments of the present invention. The controller 14 has one predetermined functional relationship stored in memory and uses it to determine the velocity threshold $V_T$ in step 82. The functional relationship can be either in the form of an equation or values stored in a look-up table. The control process then proceeds to step 84.

In step 84, the controller 14 compares the crash velocity value determined in step 76 against the velocity threshold value $V_T$ determined in step 82. A crash condition requiring deployment of the vehicle air bag 16 is indicated by a crash velocity value greater than the velocity threshold value $V_T$.

When such a crash condition exists, the process proceeds to step 86 where the air bag 16 is deployed. If, however, step 84 determines that the crash velocity value is less than the velocity threshold value $V_T$, the process loops back to step 72.

From the above description of the invention, those skilled in the art will perceive improvements, changes and modifications. For example, the invention has been described with regard to detection of side impacts. The invention is also applicable to the detection of frontal or rear impacts. Such improvements, changes and modifications within the skill of the art are intended to be covered by the appended claims.

Having described the invention, the following is claimed:

1. An apparatus for sensing a vehicle crash condition, comprising:

means for determining a crash velocity value;

means for determining a crash displacement value;

threshold determining means for determining a velocity threshold value functionally related to said crash displacement value; and control means operatively connected to said velocity value determining means and said threshold determining means for providing a signal indicative of a vehicle crash condition when the crash velocity value is greater than said velocity threshold value.

2. An apparatus as defined in claim 1, wherein said threshold determining means includes:

means for providing a velocity threshold signal the value of which is determined by a first parabolic function of said displacement signal when said displacement signal is less than a predetermined displacement reference value, and a second parabolic function when said displacement signal is greater than said predetermined displacement reference value.

3. An apparatus as defined in claim 1, wherein said threshold determining means further includes means for providing a velocity threshold value which (i) increases linearly between a first displacement value and a second displacement value, (ii) is a constant value between the second displacement value and a third displacement value, (iii) decreases linearly between the third displacement value and a fourth displacement value, and (iv) is a constant for displacement values greater than the fourth displacement value.

4. An apparatus for sensing a vehicle crash condition, comprising:

acceleration sensing means for sensing vehicle acceleration and providing a signal indicative of crash acceleration;

velocity determining means for integrating said crash acceleration signal and providing a signal indicative of crash velocity;

displacement determining means for integrating said crash velocity signal and providing a signal indicative of crash displacement;

threshold determining means for providing a velocity threshold signal having a value functionally related to crash displacement; and means for comparing said crash velocity signal against said velocity threshold signal and providing an actuation signal when said crash velocity signal is greater than said velocity threshold signal.

5. The apparatus of claim 4 further including means for mounting said acceleration sensing means so as to sense sideways acceleration of the vehicle.

6. The apparatus of claim 5 further including actuatable restraining means for restraining a vehicle occupant during a side impact.

7. The apparatus of claim 6 wherein said restraining means includes an air bag.

8. An apparatus as defined in claim 4, wherein said threshold determining means includes:

means for providing a velocity threshold signal the value of which is determined by a first parabolic function of said displacement signal when said displacement signal is less than a predetermined displacement reference value, and a second parabolic function when said displacement signal is greater than said predetermined displacement reference value.

9. An apparatus as defined in claim 4, wherein said threshold determining means further includes means for providing a velocity threshold value which (i) increases linearly between a first displacement value and a second displacement value, (ii) is a constant value between the second displacement value and a third displacement value, (iii) decreases linearly between the third displacement value and a fourth displacement value, and (iv) is a constant for displacement values greater than the fourth displacement value.

10. A method for sensing a vehicle crash condition including the steps of:

sensing vehicle acceleration;

determining a crash velocity value from said sensed acceleration;

determining a crash displacement value from said determined crash velocity value;

determining a velocity threshold value in response to said determined displacement value;

comparing said determined velocity value against said determined velocity threshold value; and providing an actuation signal when said comparing step indicates said determined velocity value is greater than said determined velocity threshold value.

* * * * *